J. McCRACKEN.
Evaporating Apparatus.
No. 872. Reissued Dec. 27, 1859.
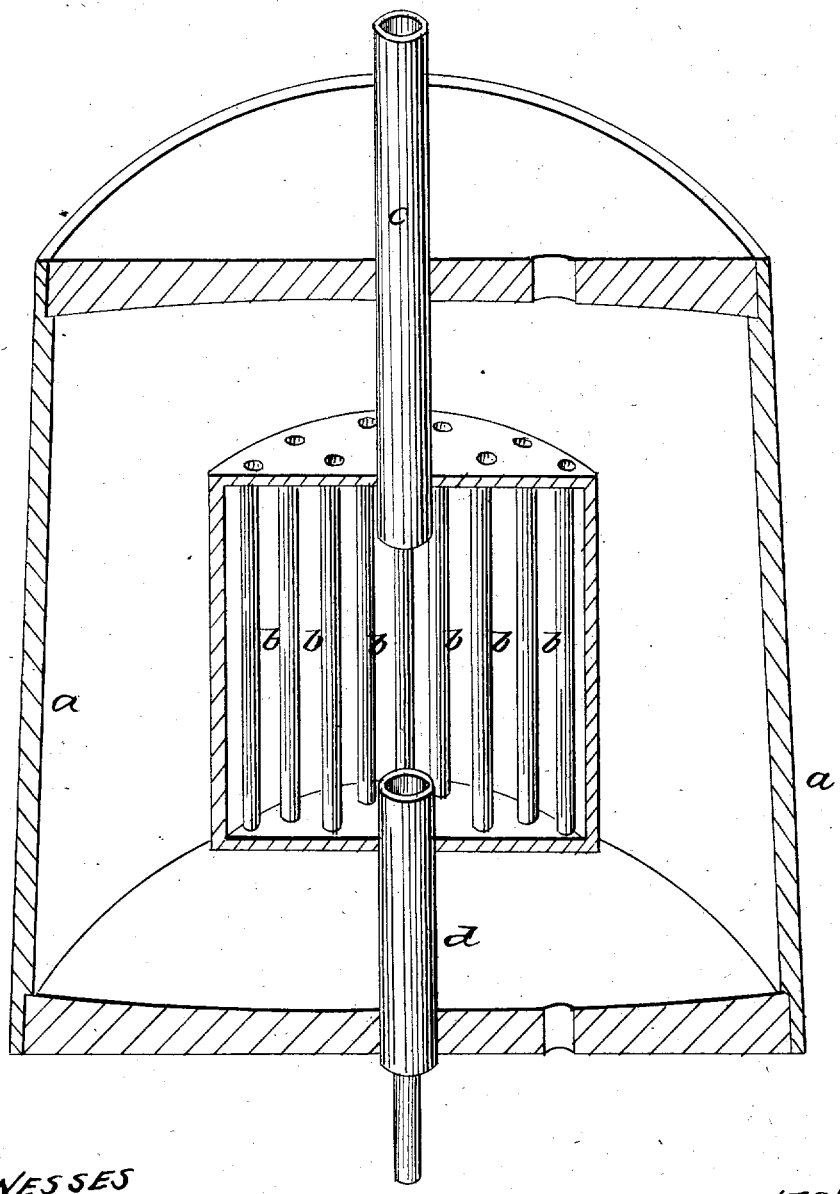
WITNESSES
John H. Cornell
E. Russell
INVENTOR
James McCracken
N. PETERS, Photo-Lithographer, Washington, D. C.

UNITED STATES PATENT OFFICE.

JAMES McCRACKEN, OF BLOOMFIELD, NEW JERSEY.

IMPROVED EVAPORATING APPARATUS.

Specification forming part of Letters Patent No. 12,516, dated March 13, 1855; Reissue No. 872, dated December 27, 1859.

*To all whom it may concern:*

Be it known that I, JAMES McCRACKEN, of Bloomfield, Essex county, New Jersey, have invented a new and Improved Evaporator for Evaporating Cane-Juice, Sirups, or other Solutions of Sugar or other Matters; and I do hereby declare that the following specification, taken in connection with the drawings, is a full, clear, and exact description thereof.

In the drawings there is represented a perspective sectional view of one of my evaporators, or, in other words, a perspective view of one-half of one of my evaporators, showing the pipes for the entrance of steam and discharge of steam and condensed water in elevation.

I am aware of the fact that many different kinds of evaporators have been devised and applied to use in which steam has been passed through a series of pipes inside of a vessel or pan, such pipes being arranged in various ways, and all having one point in common—namely, that the heat of the steam contained in the pipes is transferred to and heats or boils the solutions contained in the pans. Many of these arrangements answer well; but I known of none which give to the solution being heated such a perfect circulation in the pan and about the pipes as I desire, such circulation being desirable for various reasons.

My evaporator as a whole is constructed as follows: I take a pan of any suitable size and shape, a cylinder, for instance, such as *a*, and constructed of any suitable material, wood answering very well for certain purposes. This vessel should have a tight bottom, and if the solution is to be evaporated in vacuum a tight top, and should be provided with suitable pipes for the admission and discharge of solutions. Inside of this pan, and at some distance from the sides, bottom, and top thereof, I locate a vessel made of metal capable of resisting the pressure of steam to be used. This vessel is represented in the drawing as cylindrical, and its top is to be connected to its bottom by a series or number of metallic tubes, each of which is to be fastened steam-tight to the top and bottom of the cylinder. These tubes are shown at *b b*, and their size, number, and length will depend upon the size of the pan, and in some measure upon the peculiar opinions or preferences of those by whom the apparatus is to be used. A pipe, such as *c*, is to lead from a boiler or some other vessel supplying steam to the cylinder, and is to be connected thereto steam-tight in such a manner, substantially as shown, that steam may be admitted into the cylinder so as to fill the same and surround the tubes which connect the top of the cylinder with the bottom thereof, and another pipe, such as *d*, is to be also connected with the cylinder in such a way that the steam or condensed vapor may escape, thus permitting a constant current of steam through the cylinder and around the tubes connecting its heads. If the solution is to be evaporated in vacuum, a pipe leading to an air-pump must be connected to the head or cover of the pan, and the escape of steam from the cylinder may be regulated in any proper and usual manner. When the pan is filled and steam is admitted to the cylinder, there will be a constant current of the solution upward through the vertical tubes and downward along the sides of the pan, thus keeping all portions of the solution nearly at the same heat, permitting the vapor from the solution to pass off quietly, and preventing in a great measure bubbling and foaming, and this circulation will be due to the vertical position of the heating-tubes, to the fact that there is no obstruction to the ascending of the solution as it is heated, and to the position of the heater as a whole in the center, or thereabout, of the pan, thus affording room for the solution to descend or circulate downward in the cooler parts of the pan.

I claim as of my invention—

A pan for containing solutions to be heated, in combination with a vessel contained therein, the top and bottom of which are connected by a series of vertical or nearly vertical tubes, the interior of such vessel being connected with proper pipes for the supply of steam and the escape of steam or condensed vapor, and the whole being constructed substantially in the manner and for the purposes specified.

In testimony whereof I have hereunto subscribed my name, in the city of New York, on this 14th day of November, A. D. 1859.

JAMES McCRACKEN.

In presence of—

THOS. L. THORNELL,
JOHN H. CONNELL.